United States Patent
Buzzetti (10) Patent No.: US 9,022,671 B2
(45) Date of Patent: May 5, 2015

(54) FIBER OPTIC CONNECTOR FIBER STUB REMOVER AND METHOD

(71) Applicant: Michael Buzzetti, Templeton, CA (US)

(72) Inventor: Michael Buzzetti, Templeton, CA (US)

( * ) Notice: Subject to any disclaimer, the term of this patent is extended or adjusted under 35 U.S.C. 154(b) by 315 days.

(21) Appl. No.: 13/826,453

(22) Filed: Mar. 14, 2013

(65) Prior Publication Data

US 2014/0003781 A1    Jan. 2, 2014

Related U.S. Application Data

(60) Provisional application No. 61/665,782, filed on Jun. 28, 2012.

(51) Int. Cl.

| | | |
|---|---|---|
| *G02B 6/36* | (2006.01) | |
| *G02B 6/00* | (2006.01) | |
| *B24B 1/00* | (2006.01) | |
| *B24B 19/00* | (2006.01) | |
| *G02B 6/38* | (2006.01) | |
| *G02B 6/25* | (2006.01) | |
| *B24B 37/00* | (2012.01) | |
| *G02B 6/44* | (2006.01) | |
| *B24B 37/04* | (2012.01) | |
| *B24B 41/06* | (2012.01) | |

(52) U.S. Cl.
CPC ............ G02B 6/3863 (2013.01); *G02B 6/4439* (2013.01); *G02B 6/3898* (2013.01); G02B 6/25 (2013.01); *B24B 19/00* (2013.01); *B24B 37/00* (2013.01); *B24B 37/042* (2013.01); *B24B 41/06* (2013.01); *G02B 6/44* (2013.01)

(58) Field of Classification Search
CPC ...... G02B 6/25; G02B 6/3863; G02B 6/3898; G02B 6/44; G02B 6/4439; B24B 19/00; B24B 37/00; B24B 37/042; B24B 41/06
USPC ............... 385/76–78, 84–85, 134–139, 147; 451/5, 9–11, 41–42, 51, 57, 61, 64, 66, 451/213, 256, 259, 270, 272–273, 278, 451/282–283, 285, 331, 364, 384, 390; 65/61
See application file for complete search history.

(56) References Cited

U.S. PATENT DOCUMENTS

| | | | | |
|---|---|---|---|---|
| 5,216,846 | A | * | 6/1993 | Takahashi ........................ 451/57 |
| 7,001,080 | B2 | * | 2/2006 | Minami et al. ................... 385/85 |
| 8,128,459 | B2 | * | 3/2012 | Ling ................................ 451/11 |

* cited by examiner

Primary Examiner — Akm Ullah
Assistant Examiner — Michael Mooney
(74) Attorney, Agent, or Firm — Karish & Bjorgum, PC (57) ABSTRACT

A fiber optic connector fiber stub remover and method for automated fiber stub removal. The device has a top plate with a platen opening, and a platen with a well that carries a polishing film over the well. An air pocket is formed between the polishing film and the well. The platen is positioned with a top surface of the polishing film accessible via the platen opening. A fixture holds connector ends of fiber optic cables with fiber stubs extending therefrom, and a weight biases the fiber stubs into contact with the polishing film. A motor is controlled by a motor control unit to control a ramp up time and final speed of movement of the platen over a timespan. Each connector ends moves independently relative to the polishing film. The air pocket provides shock absorption of the polishing film so that an ideal pressure is exerted on each fiber stub during stub removal.

22 Claims, 7 Drawing Sheets

FIBER OPTIC CONNECTOR FIBER STUB REMOVER AND METHOD

CROSS-REFERENCE TO RELATED APPLICATIONS

This application claims priority from U.S. Provisional Patent Application No. 61/665,782 filed Jun. 28, 2012.

BACKGROUND OF THE INVENTION

The invention relates generally to the field of manufacturing and processing fiber optic cables, and more particularly to a fiber optic connector fiber stub remover and method.

The process of manufacturing the fiber optic light and signal transmitting element that carries the light and goes into fiber optic cable is well known and is largely automated. Extremely low attenuation rates allow optical cables to carry a high density of information with negligible error rates or the need for repeaters. For convenience of handling and ease of use, such as for connection to other devices and components, releasable connectors are positioned at the terminal ends of the optical fibers cables. The optical fibers pass through the connectors and are permanently affixed in place, e.g., by epoxy or other materials that pot the optical fibers in a plastic, composite, or Zirconia ferrule connector. In the final assembly, the terminal ends of the optical fibers will be finished to be flat, conical, or angled, but in all cases, free from imperfections so that when the fiber optic cables are connected to devices or other cables, the transmission of the optical signal will not be impeded.

During the manufacture of optical fiber connections, after the fiber is glued into the fiber optic connection, the fiber stub must be cleaved near the epoxy bead. This leaves fiber stubs that must then be removed before the optical fiber connections can be mounted to a polishing machine. Failure to do these two steps correctly can result in chips and cracks in the fiber, rendering them useless and in need of replacement. The position of the cut must be very precise and the cuts are never perfect and free from imperfections. Anything less near perfection is not good enough and therefore during the manufacturing process, after the optical fibers are cut, they must be further trimmed to be shorter and close to the bead of epoxy potted in the connector. If the optical fibers are too long when the polishing process begins, the optical fibers can easily bend and distort, preventing the ends from being processed as needed.

These steps noted above are very delicate, and there remains a substantially amount of handwork. Indeed, the process of manufacturing fiber optic cables involves numerous steps and remains labor intensive. The current industry practice in the manufacturer of fiber optic cables is to cut the optical fiber at a point relatively close to the point at which it protrudes from the connector and bead of epoxy potted in the plastic connector. This is typically done using a sharp knife, such as with a sapphire tip knife. Thereafter, a technician will take a small section of abrasive film, such as polishing or lapping film, bow it out towards the optical fiber, and gentle sand the optical fiber in a circular manner until the tip is very close to the bead of epoxy. In the industry, they refer to this process as fiber optic connector fiber stub removal.

At this point, the optical fiber cable is ready for polishing, and the technician will mount the optical fiber cable via its connector to a polishing machine. After polishing, then the ends of the optical fiber are inspected for quality control, and only those that pass the inspection are placed in use.

While there is automated equipment for polishing the ends of the fiber optic cable, to the inventor's knowledge, there are no automated devices or methods for fiber optic connector fiber stub removal.

BRIEF DESCRIPTION OF THE INVENTION

One objective of the present invention is to provide an automated device for removing fiber optic connector fiber stubs.

Another objective of the invention is to provide a method for removing fiber optic connector fiber stubs.

A further objective of the invention is to integrate this procedure into a polishing machine.

Other features and advantages of the embodiments of the present invention will become apparent from the following more detailed description, taken in conjunction with the accompanying drawings, which illustrate, by way of example, the principles of at least one of the possible embodiments of the invention.

The basic design of the fiber optic connector fiber stub remover device and method includes a platen with a countersunk well cutout section and a raised perimeter rim. Grinding paper is affixed, e.g., with contact adhesive, to the rim, thereby forming an air pocket between the grinding paper and a lower surface. This air pocket will provide some "give" as the fiber optic connector fiber stub is being ground off, with the air pocket helping to provide greater resistance the more the grinding paper is pushed down. If desired, in addition to the perimeter raised areas of the platen, a central raised area can be provided to support a central area of the grinding paper.

Initially, a very slow movement of the platen is used to start to remove the fiber stub. This speed can be increased over time by a ramp signal sent to the drive motor that moves the platen.

DETAILED DESCRIPTION OF THE INVENTION

Figure 1A:
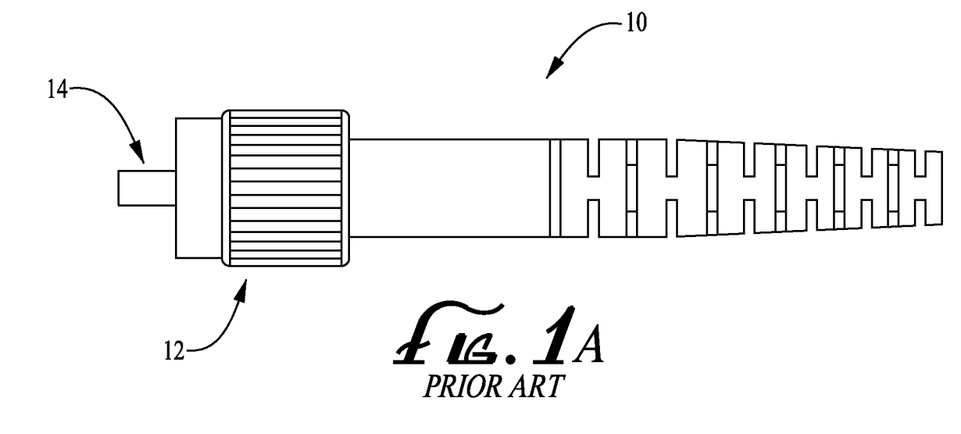
FIG. 1A is a side view of an exemplary fiber optic cable FC connector.
Figure 1B:
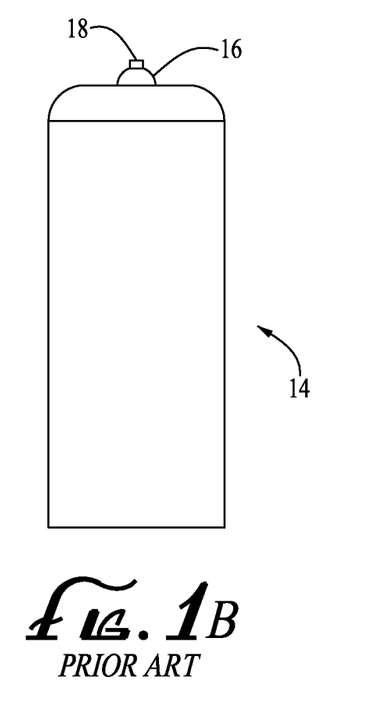
FIG. 1B is a side view of the ferrule portion of the exemplary fiber optic cable FC connector of FIG. 1A.

FIG. 1A is a side view of an exemplary prior art fiber optic cable FC connector 10, and FIG. 1B is a side view of the ferrule portion 12 of the exemplary fiber optic cable FC connector of FIG. 1A. The fiber optic cable 10 has a connector end 12, a fiber optic ferrule 14, an epoxy bead 16 that extends up from the end of the ferrule 14, and the fiber stub 18. It is this fiber stub 18 that must be shortened and brought down to the same level as the epoxy bead 16 before the manufacture of the fiber optic cable 10 can be completed by finely polishing the terminal end of the optical fiber. As noted above, in the past, the process of removing the fiber optic stub was done by hand, such as by a worker taking a section of bowed sandpaper and lightly sanding the fiber stub until it is brought down to the level of the epoxy bead 16.

FIGS. 2-6, and 11 illustrate an exemplary embodiment of an automated device for removing fiber optic connector fiber stubs of the invention and, which are further detailed in the following description.

Figure 2:
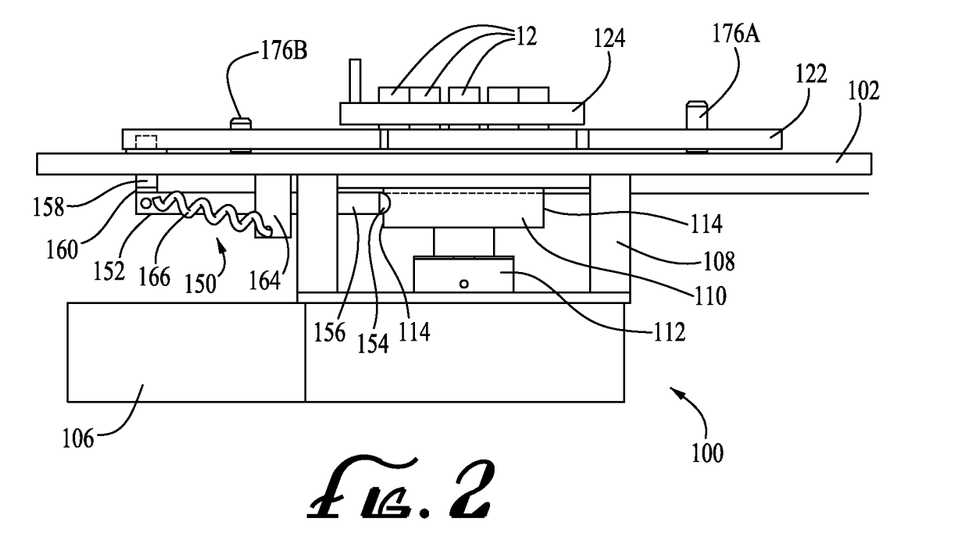
FIG. 2 is a side view of an exemplary embodiment of an automated device for removing fiber optic connector fiber stubs of the invention.
Figure 3:
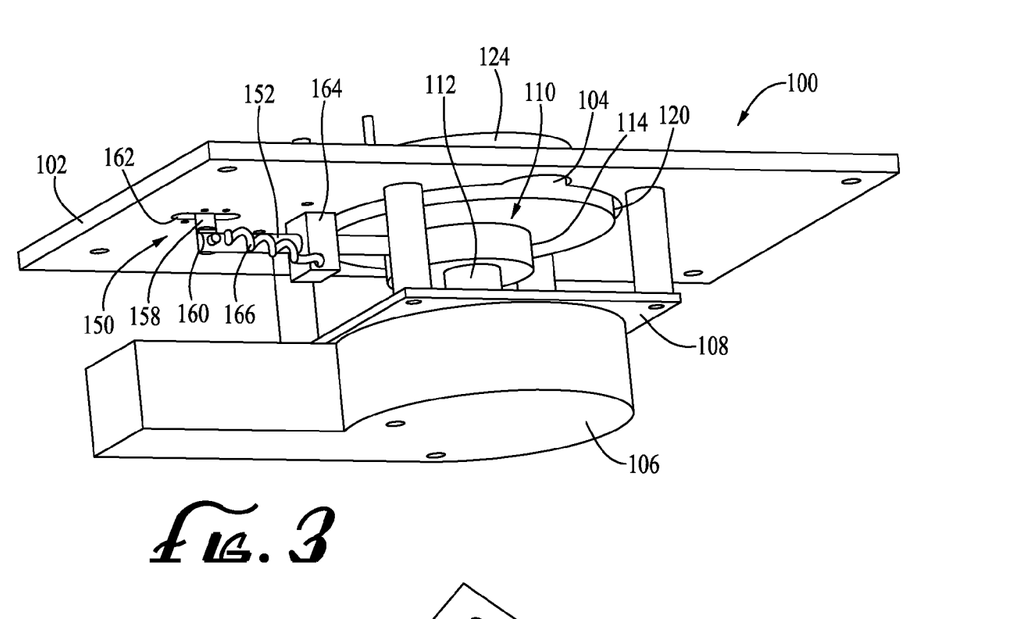
FIG. 3 is a bottom perspective view of the automated device for removing fiber optic connector fiber stubs of FIG. 2.
Figure 4:
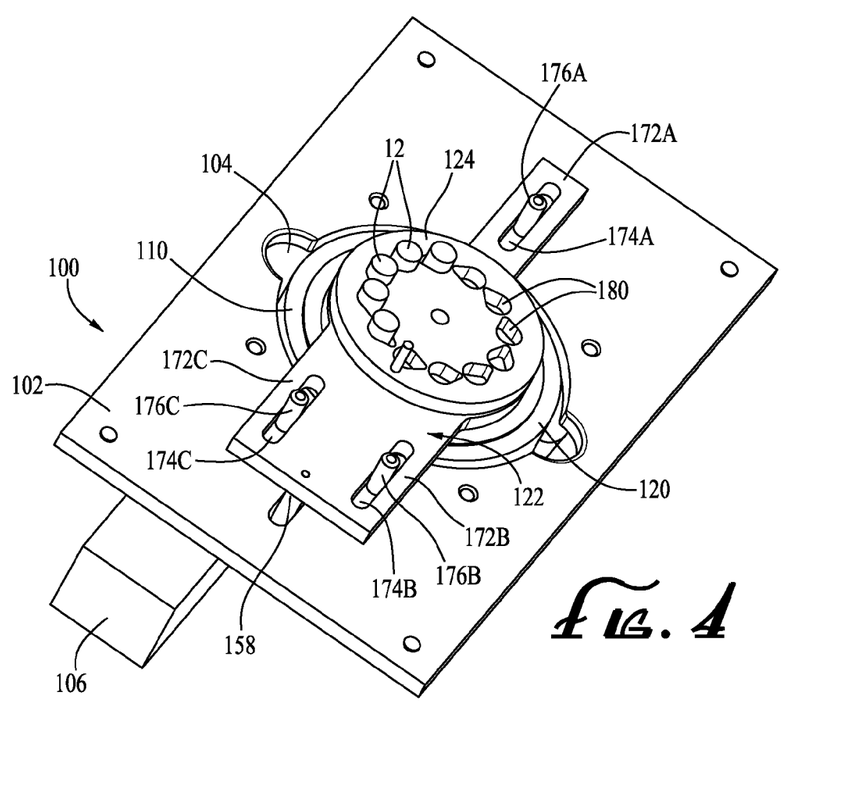
FIG. 4 is a top perspective view of the automated device for removing fiber optic connector fiber stubs of FIG. 2.
Figure 5:
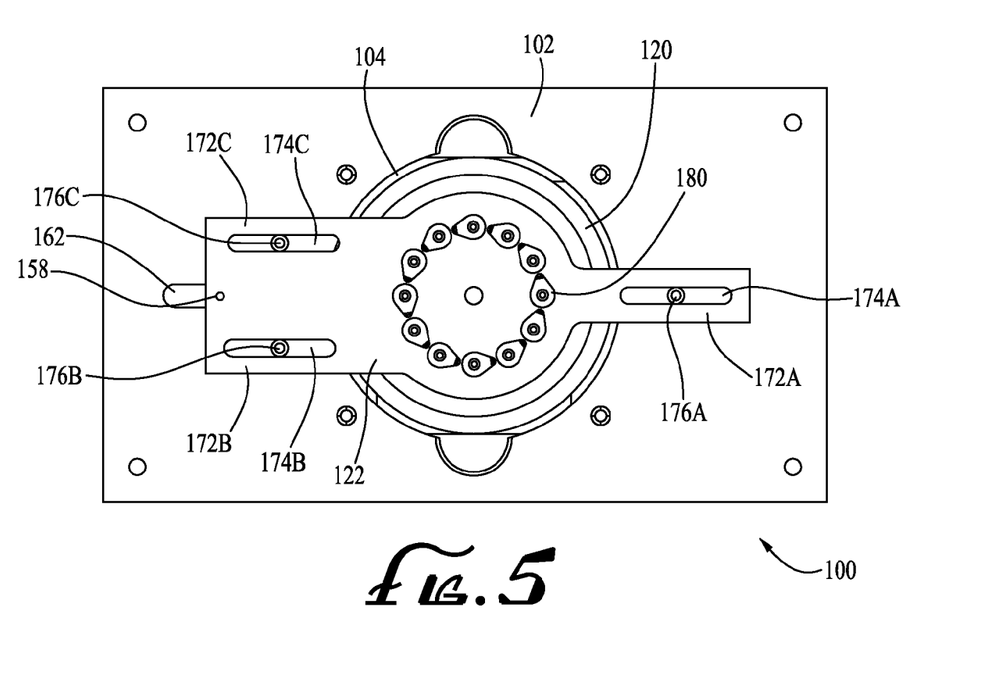
FIG. 5 is a top plane view of the automated device for removing fiber optic connector fiber stubs of FIG. 2 without the weight in place.
Figure 6:
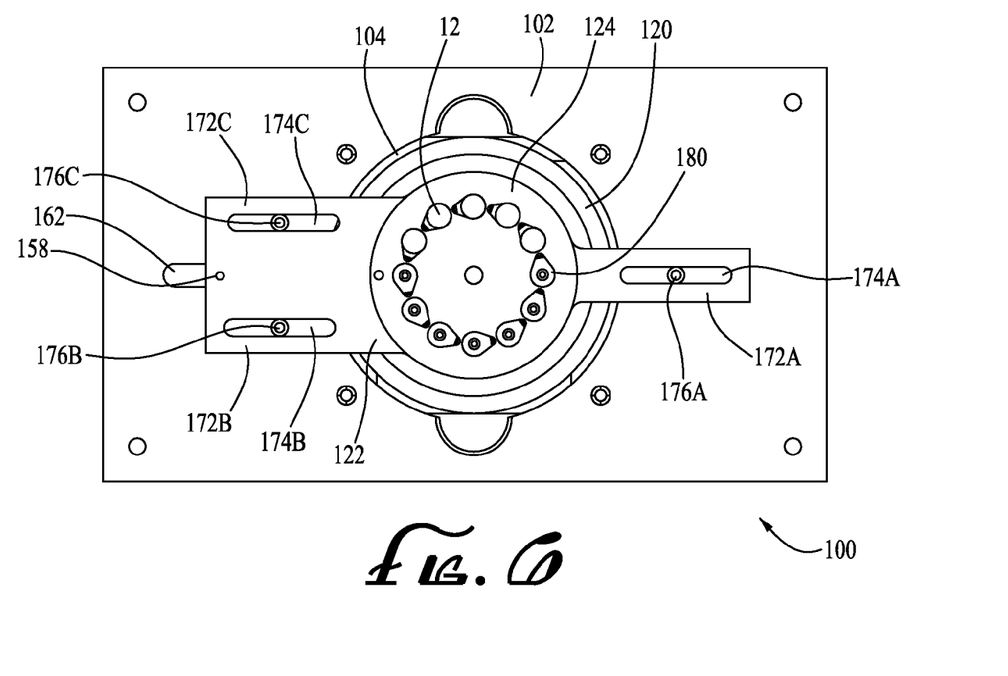
FIG. 6 is a top plane view of the automated device for removing fiber optic connector fiber stubs of FIG. 2 with the weight in place.

FIG. 2 is a side view, FIG. 3 is a bottom perspective view, and FIG. 4 is a top perspective view of an exemplary embodiment of an automated device for removing fiber optic connector fiber stubs 100 of the invention. FIG. 5 is a top plane view of the automated device for removing fiber optic connector fiber stubs of FIG. 2 without the weight in place, and FIG. 6 is a top plane view of the automated device for removing fiber optic connector fiber stubs of the invention with the weight in place. The device has a top plate 102 with a platen opening 104 formed therethrough. A motor 106 is connected to the underside of the top plate 102 by motor mount 108. A cam 110 is mounted to a shaft (not shown) of the motor 106 by a shaft mount 112 and is rotated by the motor. The cam 110 has an outer perimeter 114, and has a non-constant radius between the point at which the cam 110 it is mounted to the shaft mount 112 and to points on the outer perimeter 114 of the cam 110. The motor 106 can be operated electrically, pneumatically, hydraulically, or by other modes of operation.

Figure 8:
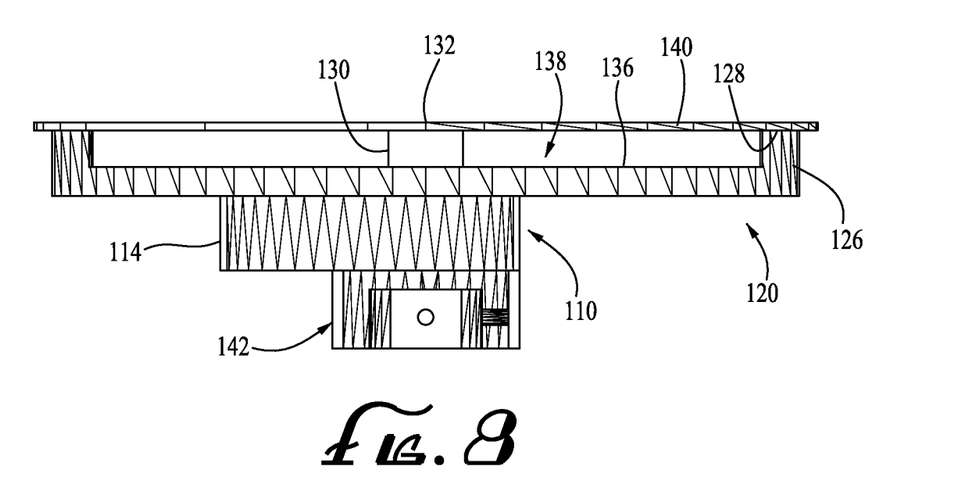
FIG. 8 is a cutaway side view showing a polishing film attached to the platen of FIG. 7 and mounted to a cam portion.
Figure 10:
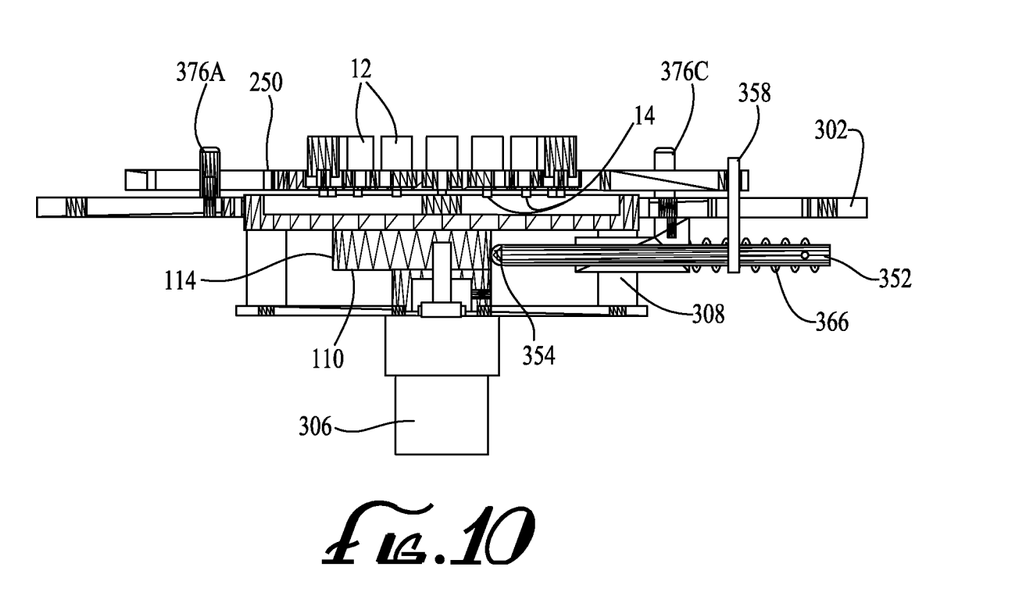
FIG. 10 is a side view showing the platen with polishing film and cam portion of FIG. 8 with the holding fixture of FIG. 9 holding fiber optic cables connected, all mounted to a conventional polishing machine.
Figure 11:
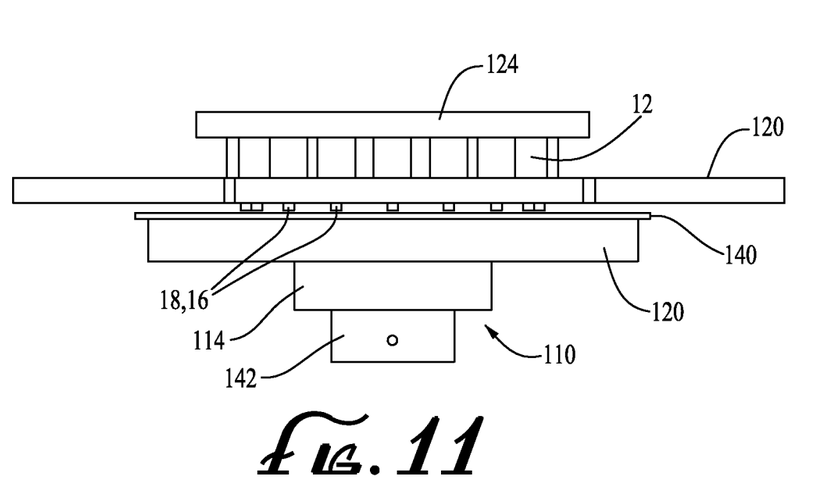
FIG. 11 is a cross-sectional side view showing a weight used to hold fiber optic cables in place on the holding fixture to push them into contact with the polishing film on the platen.

A generally circular platen 120 rides on top of the cam 110 and is rotated by the turning cam 110. The platen 120 extends through the platen opening 104 in the top plate 102. A fixture 122 for holding a plurality of the connector ends 12 of the fiber optic cable 10 being processed (see FIGS. 2, 4, and 6) floats on top of the platen 120 and a weight 124 sits on top of the fixture 122. The weight 124 applies pressure to the connector end 12 on the fiber optic cable to force is lightly downwards into contact with a polishing film 140 positioned on the platen 120, as shown in FIGS. 8, 10 and 11 as will be discussed below. Although a weight 124 is shown as applying the biasing force, other devices can be used to create the biasing force, including springs that would bias the connector ends and their fiber stubs downwardly into contact with the polishing film. Although the term "polishing film" is used herein, this film can be lapping film.

Figure 7:
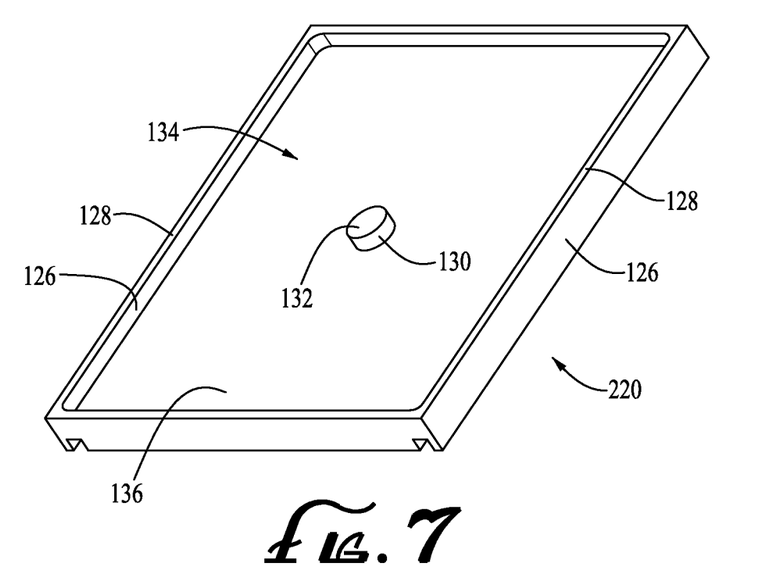
FIG. 7 is a top perspective view of an exemplary embodiment of a platen for use with a polishing machine which allows it to be used as a device for removing fiber optic connector fiber stubs.

Turning to FIG. 7, there is shown a top perspective view of an exemplary embodiment of a platen 220 for use with a polishing machine which allows the polishing machine to be used as a device for removing fiber optic connector fiber stubs. This generally rectangular platen 220 is similar to the generally circular platen 120 disclosed above, other than having a generally rectangular shape. However, other features are the same and the same reference numerals are used to describe both the generally circular platen 120 and the generally rectangular platen 220.

FIG. 8 is a cutaway side view showing a polishing film 140 attached to the platen 120 of FIGS. 3-6 and mounted to a cam portion 110. However, other than the shape of the platen 120 being generally circular versus rectangular as the platen 220 of FIG. 7, the arrangements can be the same. The platen 120 have a perimeter rim 126 with a top edge 128. An optional central standoff 130 is shown, and has a top surface 132. The level of the top edges and top surface 128 and 132, respectively, are preferably co-planar, and form a well 134 with a bottom 136. The optional central standoff 130 extends from the bottom of the well 134. The top edge and top surface 128 and 136, respectively, provide a flat surface for connection with a polishing film 140, which, for example, can be detachably attached to the top edge and top surface 128 and 132, for example, by contact adhesive on the back of the polishing film 140. However, other methods can be used to hold the polishing film 140 in place on the platen 120. This same arrangement is provided with a rectangular platen 220. When the polishing film 140 is adhered to the top edges 128 and 132 of the platen 120 and 220, an air pocket 138 is created in the well 134, with the polishing film 140 being suspended above the bottom 136 of the well 134. This air pocket 138 will act as a shock absorber and allow slight flexing of the polishing film 140 as the fiber optic cable 10 being processed for pushed down into contact with the polishing film 140, with the resistance to further flexing being controlled by the air pressure in the air pocket 138, as will be discussed further below. As best shown in FIG. 3, the generally circular platen 120 is detachably mounted to the cam 110. As shown in FIGS. 3 and 8, the shaft mount 112 provides for connection of the cam 110 to the motor 108. The cam 110 has an outer perimeter 114, and has a non-constant radius between the point at which the cam 110 it is mounted to the shaft mount 112 and to points on the outer perimeter 114.

Turning back to FIGS. 2-6, a cam follower 150 with a follower arm 152 with a rider end 154 at a distal end 156 of follower arm 152. The rider end 154 rides on the perimeter 114 of the cam 110. A drive pin 158 extends upwardly from a proximal end 160 of the follower arm 152, and the drive pin 158 extends upwardly through an elongate slot 162 formed in the top plate 102. A keeper 164 guides the follower arm 152 and can comprise a member extending from a bottom of the top plate 102 with a through hole formed therein. An elastic member 166, such as a spring, is used to ensure that the rider end 154 of the follower arm 152 rides on the outer perimeter 114 of the cam 110. As the cam 110 turns, the follower arm 152 and its drive pin 158 will thus move longitudinally along the direction of the elongate slot 162. The fixture 122 will preferably (see FIG. 5) or the weight 124 sitting on the fixture (see FIG. 6) will be connected to the drive pin 158 and will be moved relative to the rotating platen 120. However, it is possible to connect the weight 124 sitting on the fixture to the drive pin 158 (not shown). Referring to FIGS. 4-6, which show the drive pin 158 connected to the fixture 122. The fixture 122 has narrower extension 172A with a first elongate slots 174A, and an opposite wider extension that has two slots 174B and 174C formed therein, adjacent to sides 172B and 172C. Stationary guide pins 176A-C extend upwardly from the top plate 102 and pass through elongate slots 174A-C, respectively, and ensure that the fixture 122 moves laterally back and forth relative to the turning cam 110. The weight 124 has connector apertures 180 formed therein, for holding the connector ends 12 of the fiber optic cable 10. In FIGS. 2, 4, and 6 some of the aperture 180 are shown empty, and some are shown occupies with the connector ends 12 (without the rest of the optical fiber cable shown.) However, in operation of the automated device for removing fiber optic connector fiber stubs 100, normally all of the apertures 180 would be holding connectors of the fiber optic cable 10 being assembled.

Figure 9:
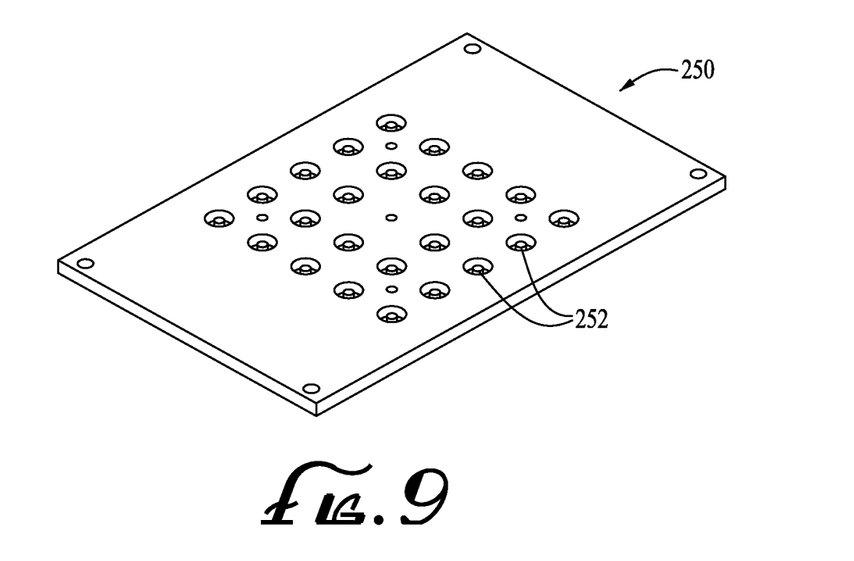
FIG. 9 is a top perspective view of an exemplary embodiment of a holding fixture for use with a polishing machine adapted for use with the platen of FIG. 7.

FIG. 9 is a top perspective view of an exemplary embodiment of a holding fixture 250 for use with the generally rectangular platen 220 of FIG. 7. The holding fixture 250 has a plurality of connector apertures 252 formed therethrough which are designed to snugly receive connectors 12 for the fiber optic cable 10 (e.g., such as being well-shaped) such that the epoxy bead 16 that extends up from the top of the ferrule 14 and the fiber stub 18 (see FIG. 1B) is positioned below a bottom surface of the holding fixture 250, where the epoxy bead and fiber stubs will be brought into contact with a polishing film that will be placed on the platen 220, as shown in FIG. 10.

FIG. 10 is a cross-sectional side view of selective portions of a convention polishing machine with the platen of FIG. 7 and holding fixture 250 of FIG. 7 connected thereto to allow the convention polishing machine to be used as automated device for removing fiber optic connector fiber stubs. FIG. 10 shows the connector ends 12 of fiber optic cables connected to the holding fixture 250. The ferrule 14 can be see extending through the bottom of the holding fixture 250. Stationary guide pins 376A and 376C ensure that the holding fixture 250 moved longitudinally in response to the motion created by a rider end 354 of a follower arm 352 riding along the perimeter rim 114 of the cam 110, which elastic member 366 biases into contact with the perimeter rim 114 of the cam 110. A motor 306 and its motor mount 308 are shown mounted below the top plate 302. A drive pin 358 transfers the motion of the moving follower arm 352 to the fixture 250. The motion set up between the connector ends 12 and the platen 250 can preferably be and orbital motion or a generally figure eight motion.

FIG. 11 is a detail view of part of the automated device for removing fiber optic connector fiber stubs 100 showing the weight 124 used to hold connector ends 12 of fiber optic cables in place on the holding fixture 120 to push them so that their fiber stub 18 and epoxy bead 16 come into contact with the polishing film 140 positioned on the platen 120. During operation of the device 100, the platen 120 will spin and the fixture 120 will moved from side to side carrying the fiber optic cables' connector ends 12 to lightly sand away at the fiber stub 18 and epoxy bead 16 so that the hand labor required to trim the fiber stub 18 can be eliminated.

In prior processing machinery, such as fiber optic cable end polishing machines, each individual fiber optic cable 10 is mounted by their connector ends 12 to independently movable carriages, so that each fiber optic cable 10 will move independently relative to polishing film, which is typically mounted to a flat plate or with a thin layer of resilient foam material. Such prior art designs are more complex, and have more moving parts that are subject to malfunction, compared to the current device, which relies of the airspace between the platen and the polishing film 140 mounted to the top edge 128 and upper surface 132 of the perimeter rim 126 and optional central standoff 130 thereof to provide for flexing of the polishing film to provide cushioning during the process of trimming the fiber stub 18 to thereby avoid damage yet result in efficient trimming of the fiber stub 18.

In a method of the invention, one or more fiber optic cables having connector ends with ferrules, from which extend fiber stub, are engaged with a fixture such that the fiber stubs extend below a lower surface of the fixture. The fixture is located over a platen with a polishing film defining an air pocket, as described above. A bias, such as a weight, is placed around the connector ends of the fiber optic cables so that the connectors in the fixture and will be pushed down so that the fiber stubs contact the polishing film. The platen is moved relative to the fixture and the connectors of the fiber optic cables so that the fiber stubs will be trimmed off by a polishing contact with the moving platen with polishing film. The platen is preferably mounted to a shaft having a cam and the shaft is rotated by a motor to rotate the platen. A follower arm riding on the cam is connected to the fixture to establish simultaneous lateral movement of the fixture relative to the platen as it is rotated. The method includes ramping up a speed of movement of the platen over a ramp up time from no movement or a slow speed, to a final higher speed in order to gradually begin to remove the fiber stubs without causing damage, and then maintaining the final higher speed for a desired amount of time to complete the fiber stub removal. The movement of the fiber optic cables relative to the platen will preferably be an orbital motion or a figure eight motion.

Figure 12:
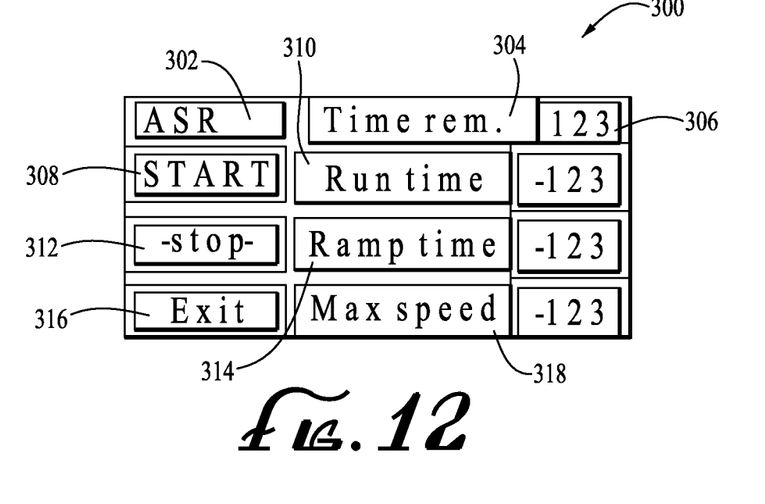
FIG. 12 is a screen print showing a display of the automated device for removing fiber optic connector fiber stubs of the invention.

FIG. 12 is an exemplary screen print 300 showing an electronic screen display of the automated device for removing fiber optic connector fiber stubs of the invention. ASR 302 stands for "Automatic Stub Removal". Time remaining 304 is the total time remaining to complete the process, and is displayed in seconds 306. Clicking on "Start" 308 initiates or continues the processing, and Run time 310 is the total run time of the process. A "Stop" button 312 can be selected to discontinue to processing. Ramp time 214 is the time it takes the platen rotation speed to get up to a desired speed, and is measured in seconds. The Exit button 316 will stop the process entirely and reset everything. The Max speed=RPM (revolutions per second), is the maximum speed at which the platen will rotate. The automated device for removing fiber optic connector fiber stubs 100 will start out at a slow speed wherein the platen is rotated slowly and the fixture is likewise moved slowly across the polishing film so that the delicate fiber stub 18 is not damaged. As the fiber stub 18 is gently abraded by the polishing film, the speed will ramp up to more quickly complete the process.

The exemplary screen print 300 is just one example of the information and manner in which it is displayed. Other possibilities can be followed.

After the fiber stubs 18 of the fiber optic cables 10 are sufficiently trimmed, the fixture 122 holding the exemplary fiber optic cables 10 by their connector ends 12 can be moved over to a polishing machine without need to remove the fiber optic cables 10 from the fixture 122, further saving time and labor.

Those having ordinary skill in the art may be able to make alterations and modifications in the present invention without departing from its spirit and scope. Therefore, it must be understood that the illustrated embodiments have been set forth only for the purposes of example and they should not be taken as limiting the invention as defined in the following.

The invention in its various embodiments can involve a service provided by various service providers using various methods including the software and hardware infrastructure necessary to support the various embodiments.

What is claimed is:
1. A fiber optic connector fiber stub remover, comprising:
  platen with a well that is adapted to carry a polishing film over the well, an air pocket being formed between the polishing film and the well;
  a motor that moves the platen; and a fixture adapted to retain a connector end of a fiber optic cable with a fiber stub extending therefrom, such that the fiber stub contacts the polishing film on the platen.

2. The fiber optic connector fiber stub remover of claim 1, further comprising a bias for biasing the connector end of fiber optic cable with fiber stub extending therefrom into contact with the polishing film on the platen.

3. The fiber optic connector fiber stub remover of claim 2, wherein the bias is a weight that engages the connector end of fiber optic cable and bears down on the fiber stub.

4. The fiber optic connector fiber stub remover of claim 1, wherein the fixture is adapted to retain a plurality of connectors with fiber stubs extending therefrom.

5. The fiber optic connector fiber stub remover of claim 4, wherein each connector end of the fiber optic cables with fiber stubs extending therefrom moves independently relative to the polishing film and the air pocket provides shock absorption of the polishing film so that an ideal force is exerted on each fiber stub during stub removal.

6. The fiber optic connector fiber stub remover of claim 1, further comprising a motor control unit to modify the speed of movement of the platen over a desired timespan and control a ramp up time and speed of the motor.

7. The fiber optic connector fiber stub remover of claim 1, further comprising a cam connected to the motor and a cam follower connected to the fixture which translate rotational motion of the motor into a non-circular polishing motion of the connector ends of fiber optic cables relative to the polishing film on the platen.

8. The fiber optic connector fiber stub remover of claim 7, wherein the motion established between the connector ends and the platen are selected from the group consisting of an orbital motion and a generally figure eight motion.

9. The fiber optic connector fiber stub remover of claim 1, wherein the well in the platen is a cutout section with a raised perimeter rim adapted to adhesively attach to the polishing film to thereby form the air pocket between the polishing film and the cutout section.

10. The fiber optic connector fiber stub remover of claim 1, further comprising a top plate with a platen opening, wherein the platen is positioned so that a top surface of the polishing film is accessible via the platen opening.

11. A fiber optic connector fiber stub remover, comprising:
a top plate with a platen opening;
platen with a well that is adapted to carry a polishing film over the well, an air pocket being formed between the polishing film and the well, the platen being positioned so that a top surface of the polishing film is accessible via the platen opening;
a motor that moves the platen;
a fixture adapted to retain a plurality of connector ends of fiber optic cables with fiber stubs extending therefrom, such that the fiber stubs extend through the platen opening and contact the polishing film; and
a weight for biasing the plurality of connector ends of fiber optic cables with fiber stubs extending therefrom into contact with the polishing film on the platen;
wherein each connector ends of fiber optic cables with fiber stubs extending therefrom moves independently relative to the polishing film and the air pocket provides shock absorption of the polishing film so that an ideal pressure is exerted on each fiber stub during stub removal.

12. The fiber optic connector fiber stub remover of claim 11, further comprising a motor control unit to modify the speed of movement of the platen over a desired timespan and a ramp up time and speed of the motor.

13. The fiber optic connector fiber stub remover of claim 11, further comprising a cam connected to the motor and a cam follower connected to the fixture which translate rotational motion of the motor into a non-circular polishing motion of the connector ends of fiber optic cables relative to the polishing film on the platen.

14. The fiber optic connector fiber stub remover of claim 13, wherein the motion established between the connector ends and the platen are selected from the group consisting of an orbital motion and a generally figure eight motion.

15. The fiber optic connector fiber stub remover of claim 11, further comprising a top plate with a platen opening, wherein the platen is positioned so that a top surface of the polishing film is accessible via the platen opening.

16. A fiber optic connector fiber stub removal device, comprising:
a platen with a cutout section forming a well and a raised perimeter rim, the rim being adapted to adhesively retain a polishing film suspended over the well to thereby form an air pocket between the polishing film and the well;
a fixture adapted to retain a plurality of connector ends of fiber optic cables with fiber stubs extending therefrom, such that the stubs contact the polishing film and wherein each connector end of the fiber optic cables moves independently relative to the polishing film and the air pocket provides shock absorption of the polishing film so that an ideal pressure is exerted on each fiber stub during stub removal;
a weight for biasing the plurality of connector ends of fiber optic cables with fiber stubs extending therefrom into contact with the polishing film on the platen; and
a motor that moves the platen relative to the fixture.

17. The fiber optic connector fiber stub removal device of claim 16, wherein the platen further comprising an additional raised area in the well to further support the polishing film over the well.

18. The fiber optic connector fiber stub removal device of claim 16, further comprising a top plate with a platen opening, wherein the platen is positioned so that a top surface of the polishing film is accessible via the platen opening, and wherein the fixture detachably engages over the plate.

19. A method for removal of fiber stub from a fiber optic connector, comprising:
taking a fiber optic cable having a connector end with a ferrule, from which extends a fiber stub, and engaging the connector with a fixture such that the fiber stub extends below a lower surface of the fixture;
providing a platen having a polishing film suspended over a well formed in the platen to form an air pocket in the platen under the polishing film;
biasing the connector end of the fiber optic cables so that the connector in the fixture is pushed down so that the fiber stubs contacts the polishing film; and
moving the fixture and platen relative to each other so that the fiber stubs will be trimmed off by a polishing contact with the moving platen with polishing film.

20. The method for removal of fiber stub from a fiber optic connector of claim 19, wherein the moving of the fixture and platen relative to each other is conducted by a motor, which motor both rotates the platen and laterally moves the fixture relative to the platen so that a non-circular motion is established.

21. The method for removal of fiber stub from a fiber optic connector of claim 19, further comprising ramping up a speed of movement of the platen over a ramp up time from no movement or a slow speed, to a final higher speed in order to gradually begin to remove the fiber stubs without causing damage, and then maintaining the final higher speed for a desired amount of time to complete the fiber stub removal.

22. The method for removal of fiber stub from a fiber optic connector of claim 19, wherein the movement of the fiber optic cables relative to the platen will preferably be one of an orbital motion and a figure eight motion.

* * * * *